(12) United States Patent
Ziakas et al.

(10) Patent No.: US 9,507,534 B2
(45) Date of Patent: Nov. 29, 2016

(54) HOME AGENT MULTI-LEVEL NVM MEMORY ARCHITECTURE

(75) Inventors: Dimitrios Ziakas, Hillsboro, OR (US); Zhong-Ning Cai, Lake Osewago, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/996,668

(22) PCT Filed: Dec. 30, 2011

(86) PCT No.: PCT/US2011/068151
§ 371 (c)(1),
(2), (4) Date: Dec. 5, 2013

(87) PCT Pub. No.: WO2013/101201
PCT Pub. Date: Jul. 4, 2013

(65) Prior Publication Data
US 2014/0082410 A1 Mar. 20, 2014

(51) Int. Cl.
G06F 11/00 (2006.01)
G06F 3/06 (2006.01)
G06F 12/08 (2016.01)

(52) U.S. Cl.
CPC .......... *G06F 3/0619* (2013.01); *G06F 3/0646* (2013.01); *G06F 3/0683* (2013.01); *G06F 12/08* (2013.01); *G06F 12/0811* (2013.01); *G06F12/0804* (2013.01); *G06F 2212/1028* (2013.01); *G06F 2212/205* (2013.01); *Y02B 60/1225* (2013.01)

(58) Field of Classification Search
CPC .. G06F 3/0619; G06F 3/0625; G06F 3/0634; G06F 3/0646; G06F 3/0683; G06F 3/0685; G06F 11/073; G06F 11/0793; G06F 11/1412; G06F 11/1446; G06F 11/1448; G06F 11/1469; G06F 12/08; G06F 12/0804; G06F 12/0811; G06F 2212/1028; G06F 2212/205
See application file for complete search history.

(56) References Cited

U.S. PATENT DOCUMENTS 5,566,123 A 10/1996 Freidin et al.
6,088,773 A * 7/2000 Kano et al. ............. 711/161

(Continued)

FOREIGN PATENT DOCUMENTS

CN 101470587 A 7/2009
TW 201102917 A 1/2011

OTHER PUBLICATIONS

Yoo, Sungjoo, Low Power Hybrid PRAM/DRAM Main Memory, 2011, Pohang University of Science and Technology Department of Electrical Engineering.*

(Continued)

*Primary Examiner* — Marc Duncan
(74) *Attorney, Agent, or Firm* — Andrews Kurth Kenyon LLP (57) ABSTRACT

Systems and methods to implement a multi-level memory system having a volatile memory and a non-volatile memory are implemented. A home agent may control memory access to both a volatile main memory and a non-volatile second level memory. The second level memory may be inclusive of the main memory. In an embodiment, the home agent may be configured to manage the memory system in a low power state. In a low power state, the volatile memory may be shut down and the non-volatile memory utilized as the only local memory. In an embodiment, the home agent may be configured to manage error recovery for the main memory by recovering the data saved locally in the second level memory. In an embodiment, multiple cores may access the second level memory.

19 Claims, 5 Drawing Sheets

(56) References Cited

U.S. PATENT DOCUMENTS

| | | | |
|---|---|---|---|
| 7,496,715 B1* | 2/2009 | Vartti et al. | 711/144 |
| 7,890,795 B1* | 2/2011 | Madnani et al. | 714/6.2 |
| 8,397,013 B1* | 3/2013 | Rosenband et al. | 711/103 |
| 8,615,678 B1* | 12/2013 | Madnani et al. | 714/5.1 |
| 2003/0212864 A1* | 11/2003 | Hicken et al. | 711/122 |
| 2006/0136688 A1 | 6/2006 | Pang et al. | |
| 2010/0115193 A1 | 5/2010 | Manus et al. | |
| 2010/0250843 A1* | 9/2010 | Eilert | 711/108 |
| 2010/0299513 A1* | 11/2010 | Ryu et al. | 713/2 |
| 2011/0010530 A1 | 1/2011 | Henry et al. | |
| 2011/0153973 A1 | 6/2011 | Kim | |
| 2011/0219190 A1* | 9/2011 | Ng et al. | 711/122 |
| 2012/0173907 A1* | 7/2012 | Moses et al. | 713/321 |
| 2012/0233497 A1* | 9/2012 | Mori | 714/6.11 |
| 2013/0086309 A1* | 4/2013 | Lee et al. | 711/103 |
| 2013/0097458 A1* | 4/2013 | Sekino et al. | 714/6.3 |
| 2013/0246825 A1* | 9/2013 | Shannon | 713/324 |
| 2014/0129767 A1* | 5/2014 | Ramanujan | G06F 12/0897 711/105 |
| 2014/0143577 A1* | 5/2014 | Nachimuthu et al. | 713/324 |
| 2014/0304475 A1* | 10/2014 | Ramanujan et al. | 711/128 |
| 2015/0089143 A1* | 3/2015 | Licht et al. | 711/128 |
| 2015/0309931 A1* | 10/2015 | Rudelic | G06F 12/084 711/130 |
| 2016/0077760 A1* | 3/2016 | Worthington | G06F 12/0223 711/154 |
| 2016/0188467 A1* | 6/2016 | Sauber | G06F 12/0804 713/330 |

OTHER PUBLICATIONS

Dhiman, Gaurav et al., PDRAM: a Hybrid PRAM and DRAM Main Memory System, Jul. 2009, ACM.*

Park, Hyunsun et al., Power Management of Hybrid DRAM/PRAM-Based Main Memory, Jun. 2011, ACM.*

Taiwan IPO Search Report dated Dec. 22, 2014,Patent Application No. 101147178, filed Dec. 13, 2012. TW 201102917 is related to U.S. Patent Application Publication No. 2011-0010530, filed Jan. 13, 2011; CN 101470587 is related to U.S. Patent Application Publication No. 2006-0136688, filed Jun. 22, 2006.

P. Wong, S. Raoux, S. Kim, J. Liang, J.P. Reifenberg, B. Rajendran, M. Asheghi, K. Goodson "Phase Change Memory—A comprehensive and thorough review of PCM technologies", vol. 98, Issue 12, Proceedings of the IEEE, Dec. 2010.

Andre Seznec, "A Phase Change Memory as a Secure Main Memory," Centre de Recherche INRIA Rennes Bretagne-Atlantique; Campus de Beaulieu, 35042 Rennes Cedex, France; seznec@irisa.fr; Manuscript submitted: Nov. 30, 2009; IEEE & CSDL—Feb. 2, 2010; Published by the IEEE Computer Society; IEEE Computer Architecture Letters, vol. 9, No. 1, Jan.-Jun. 2010; pp. 5-8.

Bipin Rajendran et al.; "Phase Change Memory—Opportunities and Challenges," Manuscript received Sep. 30, 2007. IBM j- T.J. Watson Research Center, Yorktown Heights, NY 10603; four pages.

Moinuddin Quereshi, "Scaling the Memory Wall with Phase Change Memories," IBM—T.J. Watson Reasearch Center; Seminar Sep. 2010—Abstracts, one page.

Wangyuan Zhang et al.; "Exploring Phase Change Memory and 3D Die-Stacking for Power/Thermal Friendly, Fast and Durable Memory Architectures," Intelligent Design of Efficient Architecture Lab (IDEAL); Department of Electrical and Computer Engineering, University of Florida; 18th International Conference on Parallel Architecture and Compilation Techniques, Sep. 2009; twelve pages.

International Search Report and Written Opinion issued on Aug. 30, 2012, for counterpart International Application No. PCT/US2011/68151.

* cited by examiner

HOME AGENT MULTI-LEVEL NVM MEMORY ARCHITECTURE

FIELD OF THE INVENTION

Aspects of the present invention relate generally to the field of memory storage and more specifically to improving access to non-volatile memory.

BACKGROUND

In many processors, main memory is often much smaller than the amount of data stored on an associated disk. Therefore, there are several regular transaction types that are achieved via access to the disk, such as initialization routines, searching index tables, swapping page tables, error recovery, page replacement, and retrieving data in response to a cache miss. Avoiding these disk accesses, can reduce the power and improve performance of the memory processes in the CPU.

For example a disk data access must go through a complex path having a long latency when a memory miss occurs. Then when critical data is corrupted in the main memory and needs to be recovered, it is typically recovered from disk. Erroneous data recovered from disk to main memory has to go through a complex path that may include a memory channel, interconnect, PCIe buffer, PCH bus, and disk interface wherein any error in this path can shut down the recovery process. Furthermore, if the data to transmit the recovery request to the disk itself is corrupted, recovery may not be possible.

Main memory is typically implemented as standard double data rate (DDR) dual in-line memory modules (DIMMs) or could also be eDRAM or MCDRAM or other conventional DRAM solution. Therefore, in low power situations, or to initialize instant resume from a sleep state, an NVM is desirable to conserve energy otherwise consumed by the volatile memory of DDR DIMMs and to resume from the sleep state without the high latency of accessing the disk. This kind of fast power state transition is essential for the system total power efficiency. This architecture can be extremely useful for future computer system across all segments. However, a large-capacity secondary level of memory has not traditionally been feasible in light of the latency associated with the use of NVM-based memory units.

The cost and latency of non-volatile memory (NVM) was traditionally a deterrent in implementing a large-capacity NVM as a part of a storage system in a computer system. However, improved performance and cost of NVMs, including for example PCM and PCMS type solutions, makes implementing an NVM as part of a memory hierarchy feasible. Accordingly, there is a need in the art for an efficient implementation of large-capacity NVM technologies in a CPU.

BRIEF DESCRIPTION OF THE DRAWINGS

Embodiments are illustrated by way of example and not limitation in the Figures of the accompanying drawings.

DETAILED DESCRIPTION

The following description describes systems and methods to implement a multi-level memory system having a first level volatile memory and a second level non-volatile memory (NVM). A home agent may control memory access to both a volatile main memory and a non-volatile second level memory. The second level memory may be inclusive of the main memory.

Embodiments of the home agent may be configured to manage and directly access the second level memory. The home agent manages memory access for different types of memory modules having different access latencies. Considering the different latencies, the home agent may determine which level memory to access for a given transaction or command. By accessing multiple memory types from a single home agent, home agent based local transactions may transfer data between memory modules via the home agent and may have low latency and no impact on interconnect traffic. Thus the transfer time for data to the first level memory is significantly faster than traditional memory to disk processes and the overall power of system components is reduced.

In an embodiment, the home agent may be configured to manage the memory system in a low power mode. In a low power mode, the volatile memory may be shut down and the non-volatile memory utilized as the only local memory. In a low power mode, the home agent may conserve battery power by shutting down the volatile memory and relying on NVM. Operating in a low power mode by accessing only the NVM allows for an instant resume from the local memory NVM.

In an embodiment, the home agent may be configured to manage error recovery for the first level memory by recovering the data saved locally from the second level memory. Additionally, an error recovery policy may be implemented that provides check-pointing the first level memory. Then data stored in the first level memory may be copied to the second level memory. For example a complete copy of the cache may be stored in the second level memory and regular or periodic updates of the state of the first level memory, including the most recent changes to the cache, may be stored in the second level memory.

According to an embodiment, a non-transitory machine-readable medium may store data that, when performed by a machine, causes the machine to fabricate at least one integrated circuit to perform a method to selectively apply commit and rollback operations. The method may include monitoring a change state for a plurality of entries in a primary storage element and upon receipt of an instruction comprising a request to access a backup storage element, checking the change state for each entry in the primary storage element for which the request applies. If the change state indicates the entry has been changed, the received instruction may be executed for that entry.

Embodiments may be implemented in a cloud computing or related system. As the computer system or cloud continues to increase in size, embodiments of the disclosed invention proposed may enable a new computing model for such large systems. In an exemplary system, the data contents may be distributed to main memory and an NVM $2^{nd}$ level memory to avoid long and slow disk accesses. In this way, the data access utilization can be improved 100 to 1000 times by eliminating long data access waiting time.

In the following description, numerous specific details such as processing logic, processor types, micro-architectural conditions, events, enablement mechanisms, and the like are set forth in order to provide a more thorough understanding of embodiments of the present invention. It will be appreciated, however, by one skilled in the art that the invention may be practiced without such specific details. Additionally, some well-known structures, circuits, and the like have not been shown in detail to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from reduced memory operations and improved performance. The teachings of embodiments of the present invention are applicable to any processor or machine that performs memory storage manipulations with a shadow element. The following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Embodiments of the present invention are not limited to any specific combination of hardware circuitry and software. Although the below examples describe multi-level memory storage systems, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software, which may include a machine or computer-readable medium having stored thereon instructions which may be used to program a computer (or other electronic devices) to perform one or more operations according to embodiments of the present invention. Alternatively, steps of embodiments of the present invention might be performed by specific hardware components that contain fixed-function logic for performing the steps, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a large or cloud computing system scale out storage, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor memory and storage resource, for example, load/store operations or data moves. Therefore, improving the execution time of cycle heavy operations, commit and rollback for example, could improve timing and throughput.

In one embodiment, an instruction set architecture (ISA) may be implemented by one or more micro-architectures, which includes processor logic and circuits used to implement one or more instruction sets. Accordingly, processors with different micro-architectures can share at least a portion of a common instruction set. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT)), a Reorder Buffer (ROB) and a retirement register file. In one embodiment, registers may include one or more registers, register architectures, register files, or other register sets that may or may not be addressable by a software programmer.

Figure 1:
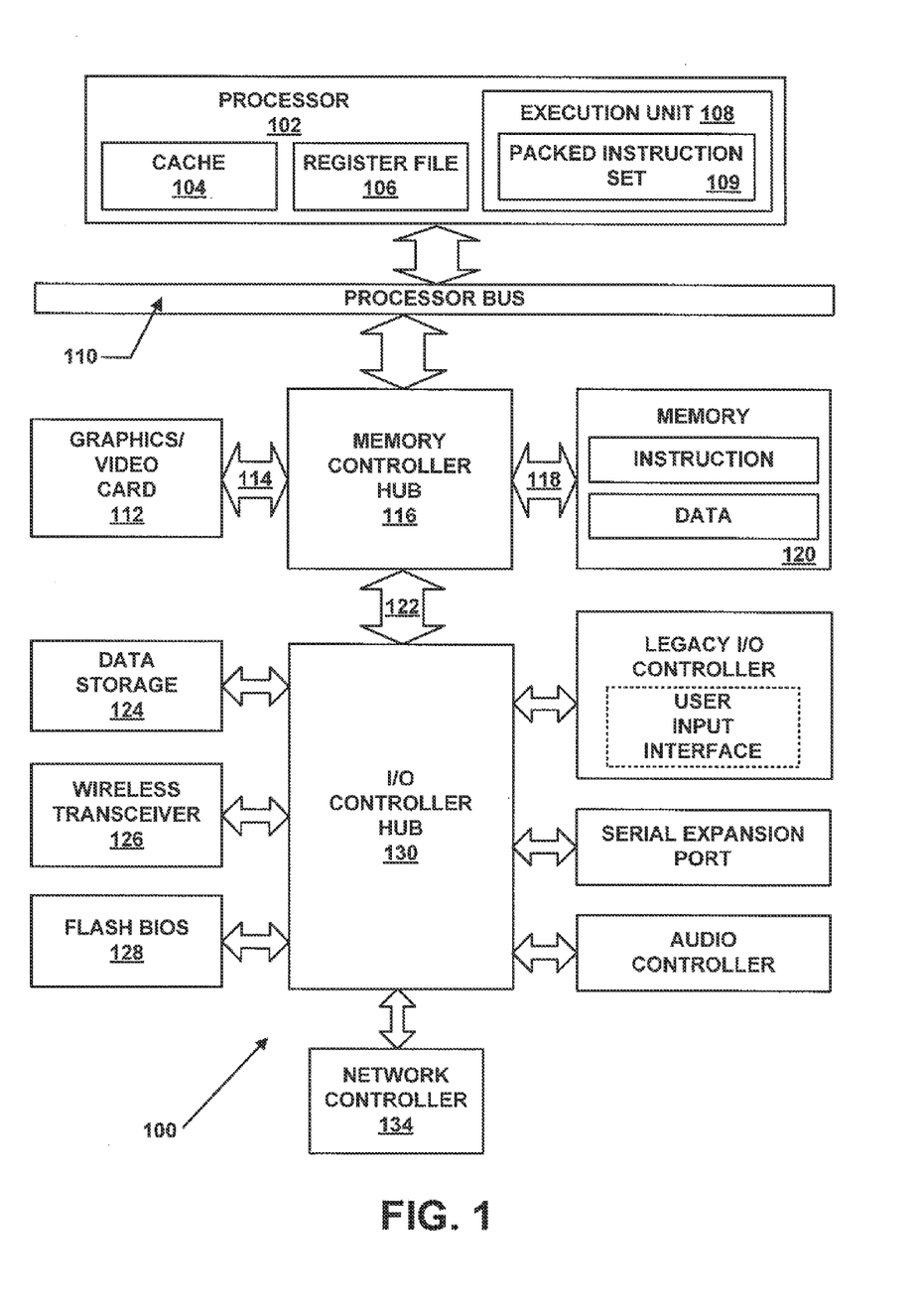
FIG. 1 is a block diagram of a system according to an embodiment.

FIG. 1 is a block diagram of an exemplary computer system formed with a processor 102 or core that includes a memory 120 and memory controller 116 in accordance with one embodiment of the present invention.

Embodiments are not limited to computer systems. Alternative embodiments of the present invention can be used in large computing systems, including for example cloud computing systems, as well as other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that implements a non-volatile memory managed in accordance with at least one embodiment. It will be readily appreciated by one of skill in the art that the embodiments described herein can be used with alternative processing systems without departure from the scope of embodiments of the invention.

FIG. 1 is a block diagram of a computer system 100 formed with a processor 102 that includes a memory 120 managed in accordance with an embodiment of the present invention. One embodiment may be described in the context of a single processor desktop or server system, but alternative embodiments can be included in a multiprocessor system. The computer system 100 includes a processor 102 to process data signals. The processor 102 can be a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to a processor bus 110 that can transmit data signals between the processor 102 and other components in the system 100. The elements of system 100 perform their conventional functions that are well known to those familiar with the art.

In one embodiment, the processor 102 includes a Level 1 (L1) internal cache memory 104. Depending on the architecture, the processor 102 can have a single internal cache or multiple levels of internal cache. Alternatively, in another embodiment, the cache memory can reside external to the processor 102. Other embodiments can also include a combination of both internal and external caches depending on the particular implementation and needs. Register file 106 can store different types of data in various registers including integer registers, floating point registers, status registers, and instruction pointer register.

Execution unit 108, including logic to perform integer and floating point operations, also resides in the processor 102. The processor 102 also includes a microcode (ucode) ROM that stores microcode for certain macroinstructions. Alternate embodiments of an execution unit 108 can also be used in micro controllers, embedded processors, graphics devices, DSPs, and other types of logic circuits.

System 100 includes a memory 120. Memory 120 can store instructions and/or data represented by data signals that can be executed by the processor 102. Memory can be a non-volatile memory, for example PCM and PCMS type non-volatile memory. Memory 120 can also be a combination of non-volatile and volatile memory, including for example a dynamic random access memory (DRAM) device, a static random access memory (SRAM) device, flash memory device, or other memory device. Memory 120 may include separate instruction and data cache units and a shared L2 cache unit.

A system logic chip 116 is coupled to the processor bus 110 and memory 120. The system logic chip 116 in the illustrated embodiment is a memory controller hub (MCH). The processor 102 can communicate to the MCH 116 via a processor bus 110. The MCH 116 may direct data signals between the processor 102, memory 120, and other components in the system 100 and bridge the data signals between processor bus 110, memory 120, and system I/O 122. The MCH 116 is coupled to memory 120 through a memory interface 118. The MCH 116 may include or be coupled to a home agent configured to manage coherence for the attached memory 120, resolve conflicts, manage memory requests, manage channel arrangement, schedule memory transactions, and manage power settings for the connected units.

For another embodiment of a system, a non-volatile memory managed in accordance with one embodiment can be used with a system on a chip. The NVM can be located on the same die as the processor and other system components, including a memory controller.

Figure 2:
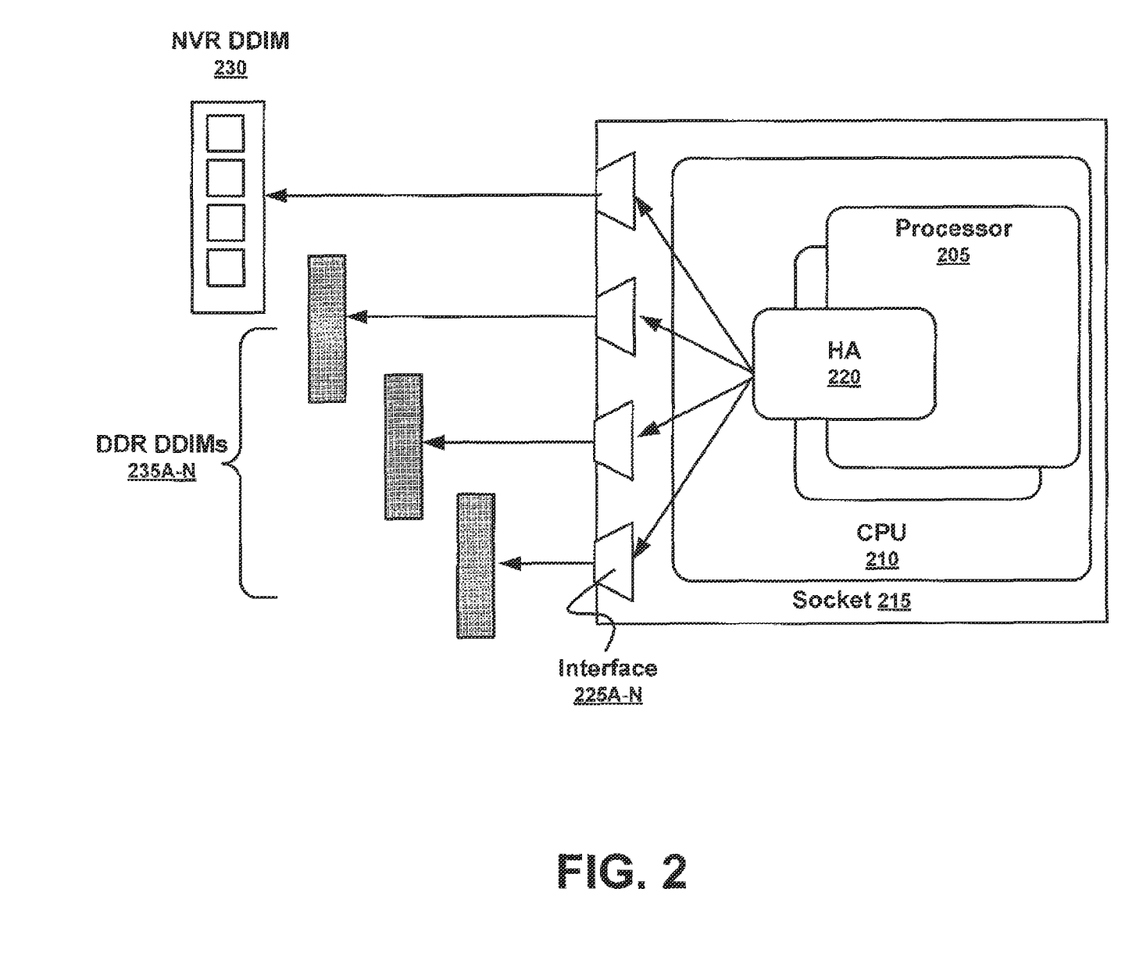
FIG. 2 is a simplified block diagram that illustrates an exemplary system according to an embodiment.

FIG. 2 is a simplified block diagram that illustrates an exemplary system 200 implementing a non-volatile memory in accordance with an embodiment. As shown in FIG. 2, a socket 215 may be fitted with a system on a chip or CPU 210 that includes one or more cores 205 as well as off core elements. The off core elements may include a home agent (HA) 220 coupled to one or more DDR DIMMs 235A-N representing main memory for the CPU 210 and at least one NVM DIMM 230 representing a second level memory for the CPU. The home agent 220 may be coupled to each of the memory units via an interface 225A-N which may include temporary data and command buffers. The HA 220 may additionally interface to an internal interconnect, such as either ring or mesh (not shown). In an embodiment, the HA 220 may be connected to an NVM-based DIMM via the same transmission DDR fabric. Then the HA 220 may implement a scheduling mechanism to trigger cycle stealing to write to the NVM DIMM.

The HA 220 may include logic for address range detection, transaction package decoding, conflict resolution, scheduling, control flow management, error handling, retry and recovery functions, and transmitting requested data, completion, and snoop packets to the requester. The HA 220 may work with memory controllers to address different memory modules 230, 235A-N. New address rules may be defined for managing a high-capacity second level memory. The memory modules 230, 235A-N may be built with different memory technologies, each having different latency characteristics.

The system 200 may map the memory addresses to define address ranges for the main memory 235 and second level memory 230. The second level memory 230 and main memory 235 may be inclusive, such that data in the main memory 235 can be evicted to second level memory 230 whereas some data in the second level memory 230 may not be in the main memory 235. Data may be directly stored in the second level memory 230 and can be directly read from the second level memory 230 without passing through the main memory 235. The HA 220 may have one or more buffers or other temporary storage to facilitate the transmission of requests, commands and data to or from the memory modules 230, 235, and to or from a requester.

The HA 220 may be implemented with tag address decoding logic to detect the address range in which a memory transaction belongs. The HA 220 may then evaluate the transaction type and priority based in part on the assigned address range. The HA 220 may implement a scheduler algorithm that arranges and dispatches a direct second level memory 230 request that goes directly to the second level memory 230. As second level memory 230 may have greater access latency than the main memory 235, the architecture may be optimized to tolerate longer access latency for second level memory access requests.

The HA 220 may be responsible for scheduling return of data and completion messages to the requester and may guarantee that messages and data are correctly and successfully delivery to the destination. Therefore, the HA 220 may be implemented with additional error handling logic to detect and manage second level memory errors and transmission errors, categorize of error classes, report errors to system software and OS.

The HA 220 may include logic to manage error recovery by implementing a policy for check-pointing the main memory 235 by storing data from the cache in the second level memory 230. For example a complete copy of the cache may be stored in the second level memory 230. Then regular or periodic updates of the state of the main memory, including the most recent cache changes may be stored in the second level memory 235.

The HA 220 may additionally include logic to manage a low power state by performing a main memory 235 dump and shutting down the main memory 235. Then the lower power second level memory 230 may be the primary memory for low power operations. For example, when the computer system is operating in battery mode, or has a low battery, and to facilitate a quicker startup when the system enters sleep mode, the second level memory 230 may be the primary memory.

Figure 3:
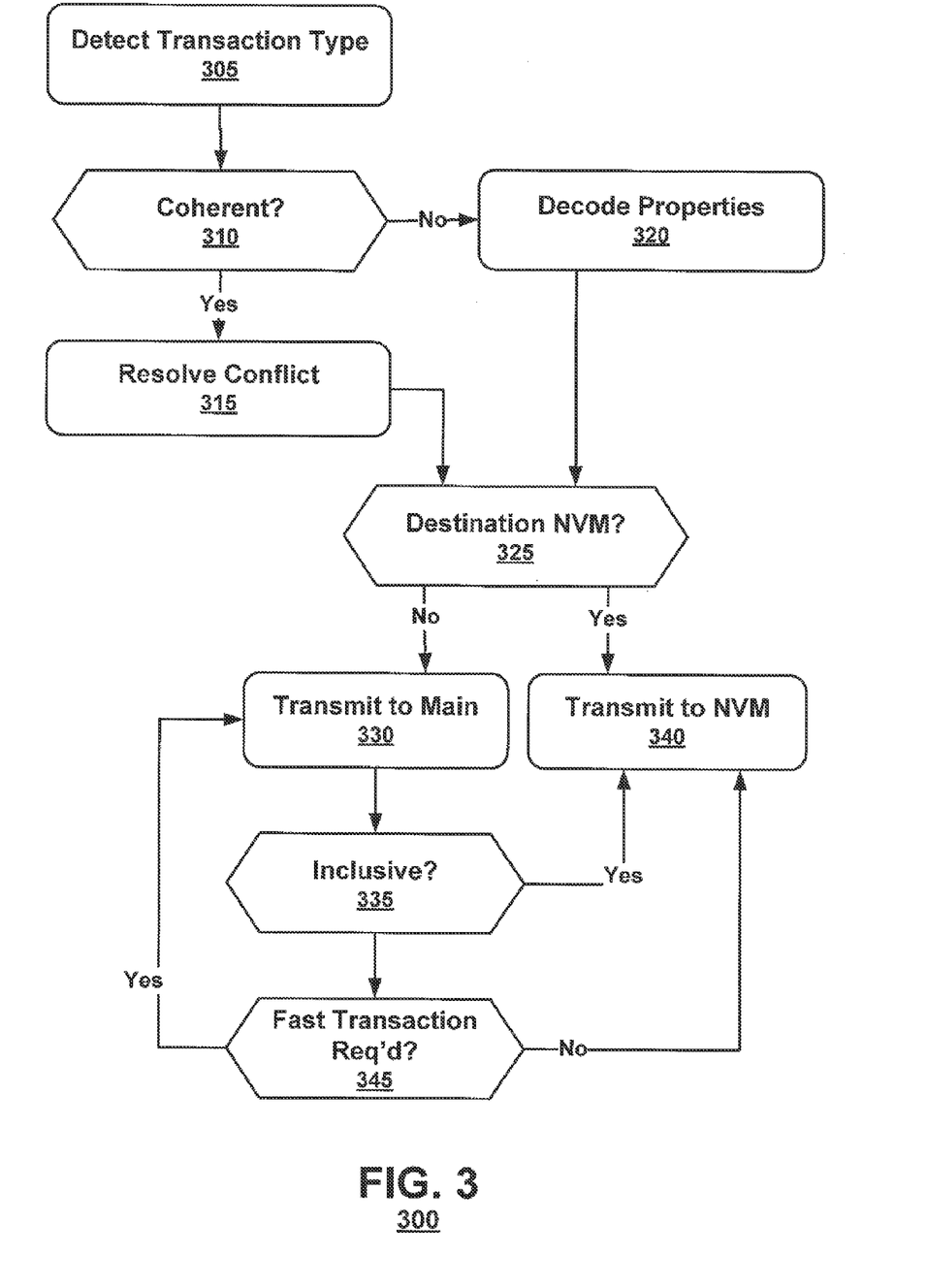
FIG. 3 is a flow diagram illustrating an exemplary method for managing a memory transaction according to an embodiment.

FIG. 3 is a flow diagram illustrating an exemplary method 300 for managing a memory transaction with a home agent according to an embodiment. As shown in FIG. 3, when the home agent or controller receives a memory access transaction, the controller may detect a property of the transaction, including for example, the address range and transaction type (block 305). If the transaction is coherent (block 310), the controller initially resolves the conflict (block 315). If the transaction is not coherent, the controller decodes additional properties of the transaction, including the priority of the transaction (block 320).

The controller may then decide the destination of the transaction (block 325). If the transaction is to go to the main memory, a command and corresponding data for the transaction may be dispatched to the main memory (block 330). If the second level memory is inclusive, the data will be additionally written to the second level memory and is dispatched to an NVM interface for transmission to an NVM memory (block 335). However, if the transaction is second level specific, then the command may go to second level or NVM memory only and the command and corresponding data may then be directly dispatched to the NVM interface for transmission to the NVM memory (block 340).

If the second level memory is not inclusive, the controller may determine whether the transaction is one that requires quick resolution, for which the lower latency main memory may be appropriate (block 345). Then the command and corresponding data for the transaction may be dispatched to the main memory (block 330). Otherwise, to improve capacity of the memory subsystem, the controller may determine that the second level memory is appropriate (block 345). Then the command and corresponding data may then be directly dispatched to the NVM interface for transmission to the NVM memory (block 340).

The controller may have other reasons to determine whether to transmit the command and corresponding data to the second level memory or main memory. For example, the controller may determine that requested data objects are too large to be effectively stored on the main memory, but that the second level memory has the capacity to manage the requested data. Additionally, only a portion of the second level memory may be inclusive of the main memory, for example for a specific application, and the remaining portion of the second level memory may exclusively store data.

Figure 4:
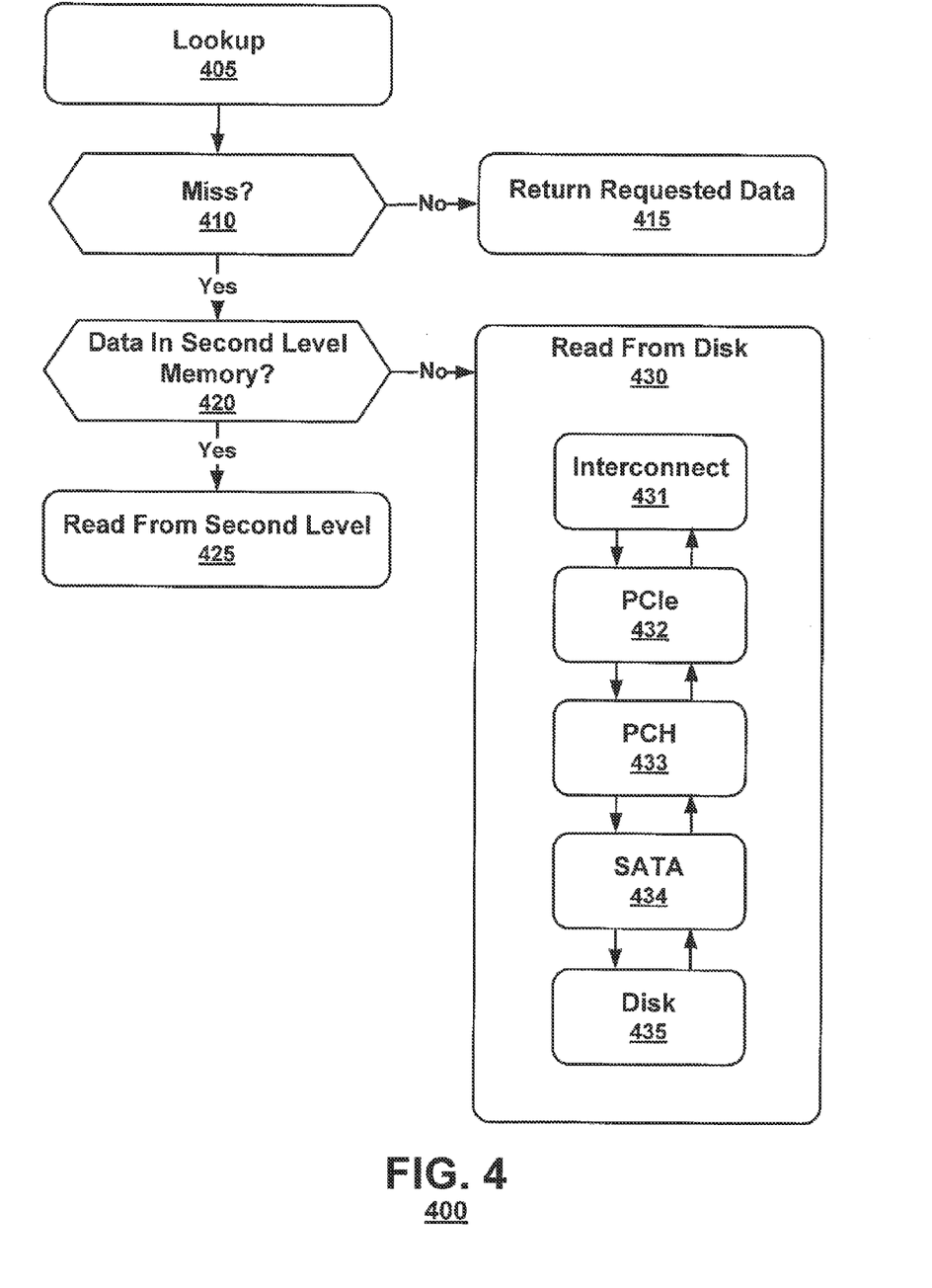
FIG. 4 illustrates an exemplary method for reading data from memory according to an embodiment.

FIG. 4 illustrates an exemplary method for reading data from memory according to an embodiment. As shown in FIG. 4, upon receipt of a request for data, a home agent may lookup the data in the main memory (block 405). If the data is in the main memory, the data may be retrieved and returned to the home agent (block 415). Upon a main memory miss (block 410), if a second level memory is implemented, the home agent may perform a lookup of the data in the second level memory (block 420). If the data is in the second level memory, the data may be retrieved and returned to the home agent (block 425). In some embodiments, the process of retrieving data from a second level memory implemented with an NVM as described herein may take approximately 100 ns.

If no second level memory is implemented, or if the data is not in the second level memory, the data may then be read from a disk, for example a hard disk drive (HDD) or solid state drive (SSD) (block 430). The process of retrieving data from a disk may include passing the request through a series of elements including a ring, mesh, or other interconnect (block 431), to a PCIe buffer (block 432), to a PCH I/O hub (block 433), to a SATA interface (block 434), to the disk to retrieve the data (block 435). The data may then be returned through the same series of elements. In some embodiments, the process of retrieving data from a disk may take approximately 10 us or more.

Therefore to take advantage of the decreased access time for accessing data in a second level memory rather than a disk drive, the second level memory may be implemented as an additional memory hierarchy with inclusion property to the main memory. Then pages and modified cached lines that are evicted from the main memory may be stored in a second level memory to meeting data coherency and consistency requirements. Then transactions that require disk access may be avoided. For example, the page table may be stored in second level memory at initialization or the primary and secondary search indexes may be built in the second level memory at runtime. Additionally, if critical data is corrupted in the main memory and needs to be recovered, rather than bringing that critical data from disk to main memory which may take a long time or may not be possible, the transaction of restoring data to main memory from the second level memory may quickly and safely recover the system with minimal system impact.

To meet data coherency and consistency requirements in the second level memory, a replaced page may first be loaded into the main memory, which may have a lower latency than the second level memory. Data may then be passed between the main memory and the second level memory via the home agent. These home agent based local transactions may have low latency and no impact on interconnect traffic. Therefore, second level memory can either quickly exchange or replace the content in main memory as they are both controlled from the same home agent.

However, any transactions marked as second level memory only may be directly stored and read out from the second level memory to the processor. Content of the second level memory may be written back to the disk upon a memory eviction event. The second level memory may be implemented with a lazy eviction policy in which the second level memory automatically writes back a selected page to disk when the total page occupancy of the second level memory is over a given threshold. Other known methods of memory management may be implemented for the main and second level memories.

Figure 5:
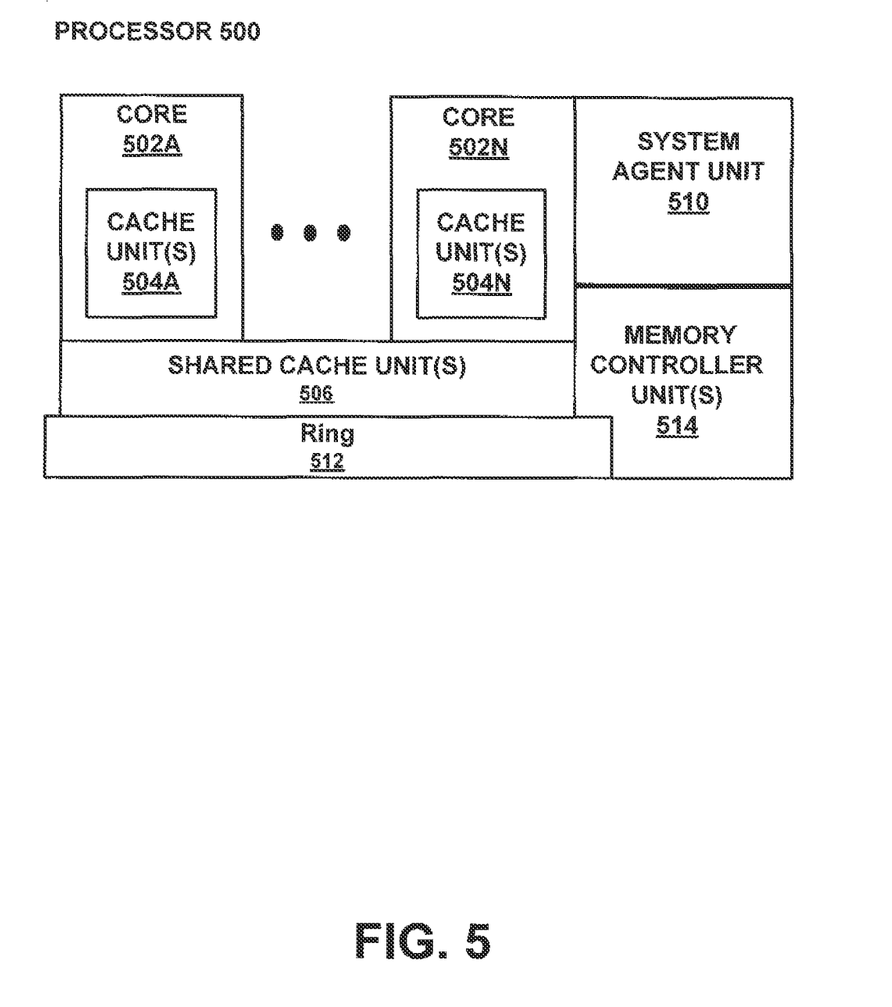
FIG. 5 is a simplified block diagram of a multicore processor with a memory controller implemented according to an embodiment.

FIG. 5 is a simplified block diagram of a multicore processor 500 with a memory controller implemented according to an embodiment. FIG. 5 illustrates a processor 500 with multiple cores 502A-N, and a set of one or more integrated memory controller unit(s) 514 connected to a system agent unit 510. While in one embodiment a ring based interconnect unit 512 interconnects the set of shared cache units 506 and the system agent unit 510, any number of well-known techniques may be used for interconnecting such units. In some embodiments, one or more of the cores 502A-N are capable of multi-threading. The cores 502A-N may be homogenous or heterogeneous in terms of architecture and/or instruction set. For example, some of the cores 502A-N may be in order while others are out-of-order. As another example, two or more of the cores 502A-N may be capable of execution the same instruction set, while others may be capable of executing only a subset of that instruction set or a different instruction set.

The memory hierarchy includes one or more levels of cache within the cores, a set or one or more shared cache units 506, and external memory (not shown) coupled to the set of memory controller units 514. The set of shared cache units 506 may include one or more mid-level caches, such as level 2 (L2), level 3 (L3), level 4 (L4), or other levels of cache, a last level cache (LLC), and/or combinations thereof. The shared cache units 506 may include at least one NVM DDIM as previously described. Then the memory controller unit may include a home agent to manage access by each of the multiple cores 502A-N to the NVM.

The system agent 510 includes those components coordinating and operating cores 502A-N. The system agent unit 510 may include for example a power control unit (PCU) and a display unit. The PCU may be or include logic and components needed for regulating the power state of the cores 502A-N. The PCU, for example may manage power by setting the system to utilize a second level NVM memory in low power modes.

The processor may be a general-purpose processor or a special-purpose processor, such as, for example, a network or communication processor, compression engine, graphics processor, co-processor, embedded processor, or the like. The processor may be implemented on one or more chips. The processor 500 may be a part of and/or may be implemented on one or more substrates using any of a number of process technologies, such as, for example, BiCMOS, CMOS, or NMOS.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Thus, techniques for performing NVM memory functions according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A method comprising:
    receiving at a controller a transaction request from a processor comprising a command to access data stored in local memory;
    determining if the data is in a main memory or a second level memory;
    managing access to the local memory in response to the command, wherein data in the main memory is evicted to the second level memory in accordance with a cache coherence policy; and managing the local memory in a low power mode by shutting down the main memory.

2. The method of claim 1, further comprising:
maintaining inclusivity in the second level memory for data in the main memory.

3. The method of claim 1, further comprising:
managing an error recovery policy for data in the main memory.

4. The method of claim 3, further comprising:
recovering data causing an error in the main memory from the second level memory.

5. The method of claim 3, further comprising:
periodically copying the state of the main memory to the second level memory.

6. The method of claim 1, further comprising:
accessing the second level memory for each command received while in low power mode.

7. A system comprising:
a main memory unit comprising volatile memory;
a second memory unit comprising non-volatile memory;
a processor having an execution unit configured to execute commands to access data stored in either the main memory unit or the second memory unit; and
a controller coupled to the processor, the main memory unit and the second memory unit, the controller configured to receive transactions from the processor and to manage access to the main memory and the second to execute the transaction, the controller including logic to manage the system in a low power state by shutting down the main memory unit and to process transactions received from the processor with the second memory unit.

8. The system of claim 7, wherein the second memory unit is inclusive of the main memory unit.

9. The system of claim 7, the controller further comprising:
logic configured to manage error recovery for data in the main memory unit comprising recovering the data from the second memory unit.

10. The system of claim 9, wherein the logic is configured to periodically copy the state of the main memory unit to the second memory unit.

11. The system of claim 7, the controller further comprising:
logic configured to manage cache coherency for data in the main memory unit comprising copying data evicted from the main memory unit to the second memory unit.

12. The system of claim 7, the controller further comprising:
logic configured to manage a cache coherency policy for the combined main memory unit and second memory unit.

13. The system of claim 7, wherein the second memory unit comprises a PCM DIMM.

14. The system of claim 7, wherein the main memory unit comprises a DDR DIMM.

15. The system of claim 7, further comprising:
a second processor coupled to a second main memory unit and to the second memory unit.

16. A processor comprising:
a first memory unit comprising volatile memory;
a second memory unit comprising non-volatile memory;
a core having an execution unit configured to execute commands to access data stored in either the first memory unit or the second memory unit; and
a home agent coupled to the processor, the first memory unit and the second memory unit, the home agent configured to receive transactions from the core and to manage access to the first memory and the second memory to execute the transaction, the home agent comprising logic configured to manage the processor in a low power state comprising shutting down the first memory unit.

17. The processor of claim 16, wherein the second memory unit is inclusive of the first memory unit.

18. The processor of claim 16, the home agent further comprising:
logic configured to manage error recovery for data in the first memory unit comprising recovering the data from the second memory unit.

19. The processor of claim 16, the home agent further comprising:
logic configured to manage cache coherency for data in the main memory unit comprising copying data evicted from the main memory unit to the second memory unit.

* * * * *